United States Patent
Ford et al.

(10) Patent No.: US 8,745,834 B2
(45) Date of Patent: Jun. 10, 2014

(54) STATOR COIL REMOVAL METHOD

(75) Inventors: Keegan M. Ford, Orlando, FL (US);
Benjamin T. Humphries, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 35 days.

(21) Appl. No.: 13/441,054

(22) Filed: Apr. 6, 2012

(65) Prior Publication Data

US 2013/0263421 A1  Oct. 10, 2013

(51) Int. Cl.
*B23Q 17/00* (2006.01)

(52) U.S. Cl.
USPC ............... 29/403.4; 29/596; 29/762; 134/19

(58) Field of Classification Search
USPC .......... 29/605–606, 603.24, 732–736, 29/596–598, 403.4, 762; 242/365.3–365.6, 365.8; 140/92.1; 702/56, 33, 76; 134/19, 30, 31
See application file for complete search history.

(56) References Cited

U.S. PATENT DOCUMENTS

| | | | | |
|---|---|---|---|---|
| 3,146,520 A | * | 9/1964 | Eustachio | 29/762 |
| 3,342,638 A | * | 9/1967 | Wanzenberg | 75/403 |
| 3,842,303 A | * | 10/1974 | Simmonds et al. | 310/260 |
| 4,016,639 A | * | 4/1977 | Dombrowski et al. | 29/762 |
| 4,208,221 A | * | 6/1980 | Rosen | 134/19 |
| 5,001,828 A | * | 3/1991 | Missman | 29/732 |
| 5,070,603 A | * | 12/1991 | Waldsmith | 29/829 |
| 5,199,159 A | * | 4/1993 | Waldsmith | 29/596 |
| 5,295,388 A | * | 3/1994 | Fischer et al. | 73/12.09 |
| 5,946,792 A | * | 9/1999 | Beakes | 29/596 |
| 6,631,335 B2 | * | 10/2003 | Lusted et al. | 702/56 |
| 7,741,854 B2 | * | 6/2010 | Humphries et al. | 324/546 |
| 7,854,167 B2 | * | 12/2010 | Hashiba et al. | 73/572 |
| 8,245,386 B2 | * | 8/2012 | Dailey et al. | 29/732 |

* cited by examiner

*Primary Examiner* — Minh Trinh

(57) ABSTRACT

A method of removing a stator coil (10) from a stator core (12) of an electrical generator, including vibrating an unbonded portion (50) of the coil (10) until a resin bond material (32) between a bonded portion of the coil (46) and a surface (34) of the core (12) fails due to high cycle fatigue to free the coil (10) from the core (12).

15 Claims, 2 Drawing Sheets

STATOR COIL REMOVAL METHOD

FIELD OF THE INVENTION

The invention relates generally to stator rewind procedures for electro-dynamic machines. More particularly, this invention relates to removing a stator coil from a stator core of an electrical generator when the coil has been resin bonded to the core.

BACKGROUND OF THE INVENTION

In many modern generators the stator coil includes conductors separated and wrapped with a tape, e.g. a mica tape. This assembly is impregnated with a resin insulation that removes air, gas, and moisture, to provide a void-free insulation. In some generators the coil is impregnated first and then assembled to the core. In other generators the coil and core are assembled first, and the entire assembly is impregnated with the resin in a process to form a monolithic stator assembly. An example of this process is Global Vacuum Pressure Impregnation (GVPI). In a GVPI process the stator assembly is processed in an alternating vacuum and pressure environment that ensures uniform distribution of resin throughout the assembly. The resin is cured to form the monolithic stator assembly. Benefits of GVPI include improved structural strength and improved resistance to moisture and chemicals etc.

When a stator rewind is necessary, where the stator coils must be removed and replaced, each coil must be removed from a slot within the stator. The coil is resin bonded into the slot, and the bond is necessarily strong. Conventional practice has been to engage the end windings of the coil and to pull them upward out of the slot with enough mechanical force to extract the coil. However, this leaves a lot of the resin still bonded to the surface of the slot, and a subsequent operation is necessary to remove the residual resin from the surface of the slot. This subsequent operation is labor intensive and time consuming.

BRIEF DESCRIPTION OF THE DRAWINGS

The invention is explained in the following description in view of the drawings that show.

DETAILED DESCRIPTION OF THE INVENTION

The present inventor has recognized that the traditional method of coil removal by mechanical force actually tears the tape present on the windings, yet leaves the resin bond to the stator slot surface largely intact. The inventor further recognized this to be a result of a greater mechanical strength of the bond than the tape, which enables the bond to resist the mechanical extraction force until after the tape has yielded. The inventor further recognized that the resin bond is more rigid than the tape, and as a result is likely to have a lower resistance to high frequency mechanical fatigue than the tape. As a result the inventor has developed an innovative approach to removing the coil from the core that targets the weaker fatigue strength of the bond such that the bond breaks due to fatigue while the tape remains intact. Specifically, by applying high frequency vibrations to the coil, the bond is repeatedly stressed by the vibration forces until it breaks. However, because the tape is capable of withstanding these low displacement/high cycle forces better than the bond, it remains intact. When the process is complete, the coil is freed from the stator, the resin bond is destroyed, and only a reduced amount of the resin is left adhered to the slot. An advantage of this process is the reduced amount of time required for resin removal from the slot subsequent to the coil removal.

Figure 1:
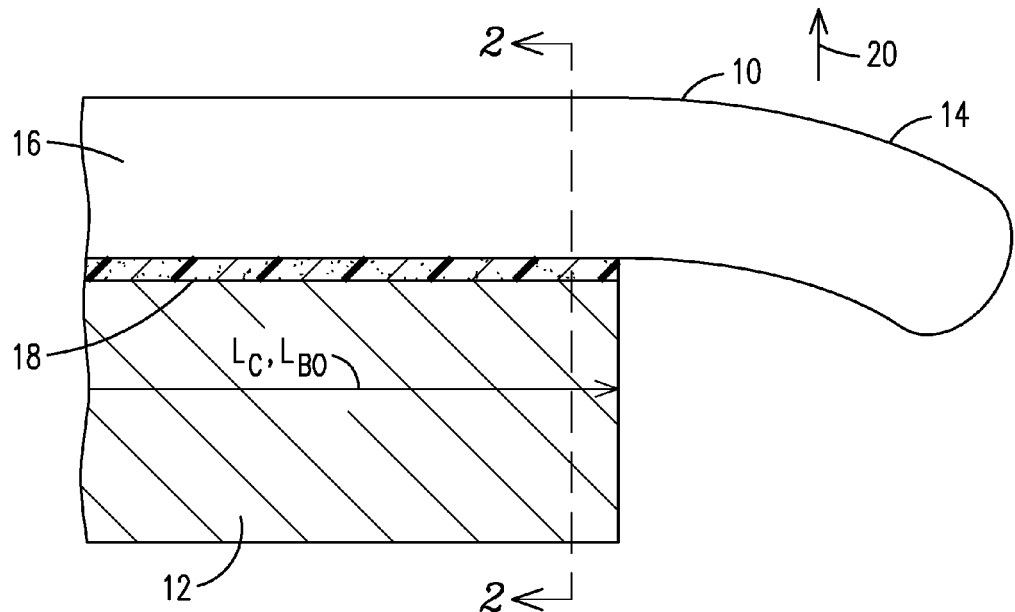
FIG. 1 is a schematic partial cross section of a stator coil in a stator core.

FIG. 1 shows a schematic partial cross section of a stator coil 10 in a stator core 12. The stator coil 10 includes an end winding 14 and a straight portion (bar) 16. The bar 16 is disposed in a slot 18 present in and running a length $L_C$ of the core 12, and thus the original bond is characterized by an original bond length $L_{BO}$ that may be equal to the slot length $L_C$. Prior coil removal techniques involved securing a device to the end winding 14 and lifting the end winding 14 upward as indicated by arrow 20. This upward movement pulled upward on the bar 16, prying it from the slot 18, by tearing the tape that forms the exterior of the coil 10.

Figure 2:
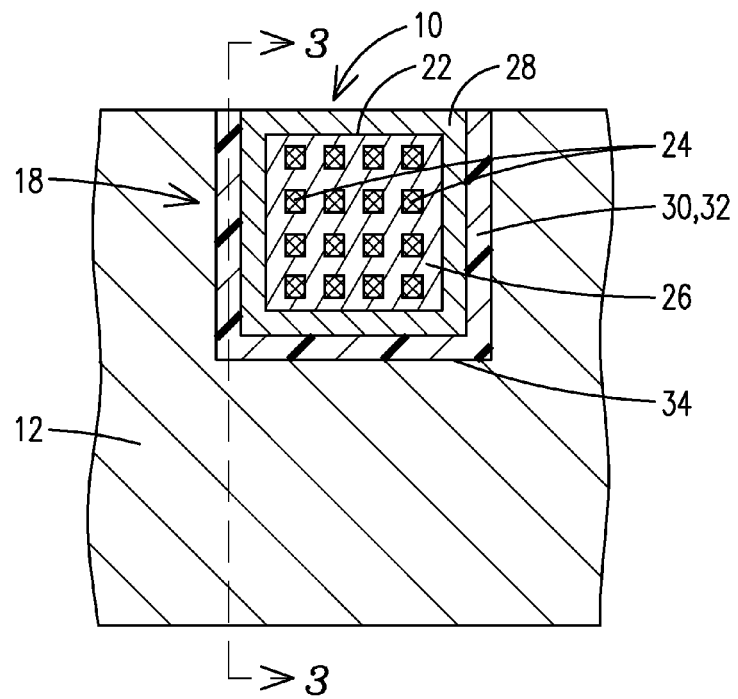
FIG. 2 is a schematic partial cross section 2-2 of FIG. 1.

FIG. 2 is a schematic partial cross sectional view as seen at section 2-2 of FIG. 1 showing the stator coil 10 in the slot 18 of the core 12. The coil 10 includes a conductor bundle 22 that includes individual conductors 24 separated by interposed tape 26, and external tape 28 that surrounds the conductor bundle 22. A resin bond 30 made of resin material 32 secures the external tape 28 to a surface 34 of the slot 18. Under the old removal method, the external tape 28 would fail (tear) due to the applied mechanical force, while the resin bond material 32 would remain. This would necessitate the subsequent operations to remove the resin bond material 32 from the surface 34 of the slot 18.

The method disclosed herein includes vibrating the coil 10 in such a way that the resin bond material 32 reaches its fatigue limit before the external tape 28 reaches its fatigue limit. Due to the inherent characteristics of the materials, this can be accomplished by attaching a vibration inducing device 40 to the coil. Inducing vibration for a sufficient time causes the resin bond material 32 to reach its fatigue limit first, such that a crack forms in the bond 30 which begins to propagate along the bond 30, thereby breaking the bond 30. When the crack has propagated the entire original length $L_{BO}$ of the bond the coil 10 is fully freed from the slot 18.

Figure 3:
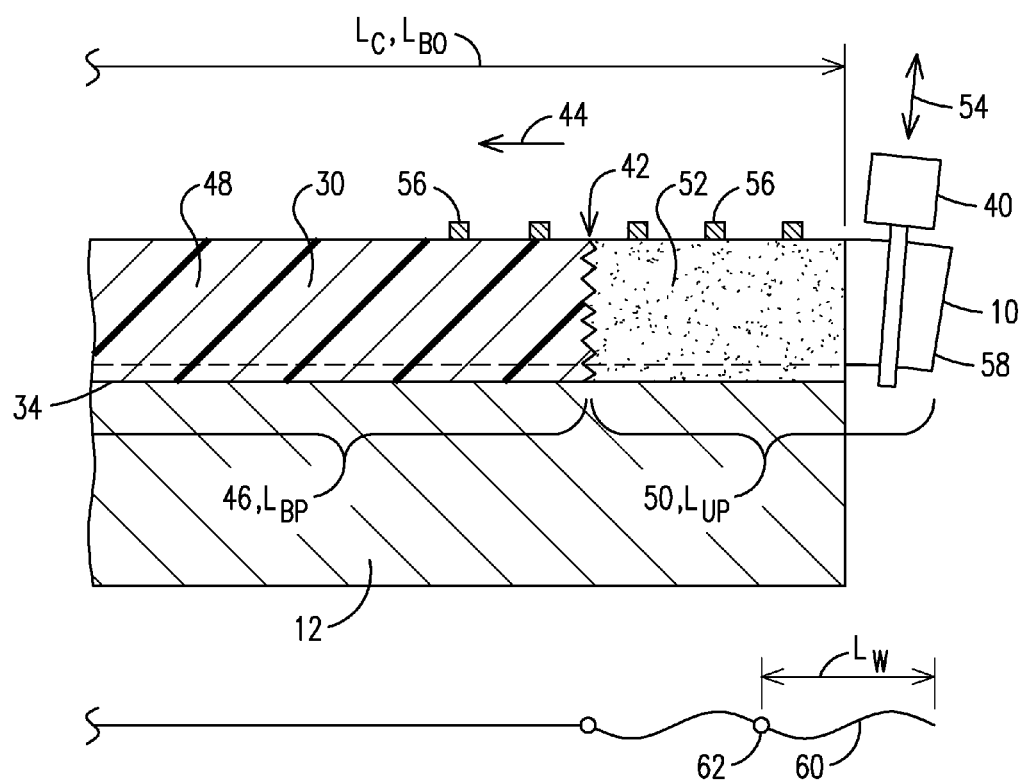
FIG. 3 is a schematic partial cross section 3-3 of FIG. 2.

FIG. 3 is a schematic partial cross sectional view as seen at section 3-3 of FIG. 2 showing the coil 10 and the core 12 after a vibration device 40 has induced and propagated a leading edge 42 of a crack partially along the bond 30 in a direction 44. This propagation leaves a bonded portion 46 with intact resin bond material 48 as indicated by the hatch markings. The bonded portion is characterized by a bonded portion length $L_{BP}$. This propagation also forms an unbonded portion 50 of unbonded portion length $L_{UP}$ where failed resin bond material 52 is indicated by dots. As the crack progresses, the bonded portion length $L_{BP}$ gradually decreases, and the unbonded portion length $L_{UP}$ gradually increases. Failed resin bond material 52 may include some resin bond material 32 on the surface 34 of the slot and some resin bond material 32 on the external tape 28. Some of the resin bond material 32 may become pulverized by relative movement between the unbonded portion 50 and the slot 18 during continued vibration. In this embodiment the vibration device 40 has induced motion in a direction indicated by arrows 54. The vibration device 40 may be secured in any manner known to those in the art. In an exemplary embodiment the vibration device 40 is strapped to the unbonded portion 50.

So long as the yield strength of the external tape 28 is not exceeded by the vibration induced forces, nearly any frequency and amplitude of vibration may be selected. It is estimated that vibration amplitudes up to 0.100 inches (2.54 mm) may be permissible, however, this may vary in different applications. In an exemplary embodiment, a frequency and amplitude of vibration may be applied to the coil without change until the bond is broken. Alternately, the vibration device 40 may vary frequencies in any number of patterns. For example, the vibration device may be capable of delivering a range of frequencies, and the frequencies selected may vary within that range over time. It may vary in a step wise manner, where a first frequency is selected, and then a second etc. It may vary in a cyclic manner, such that the frequencies applied to the coil 10 sweep from lowest to highest etc. The range applied may or may not be adjustable. Any number of other loadings may be envisioned. Other scenarios include ramping the frequency, either from low to high or from high to low. Further, random frequencies may be employed. Any combination of the above is likewise possible.

In addition to varying the frequency, the amplitude may be varied in a manner similar to how the frequency is varied. In particular, the amplitude of the vibrations may remain the same, may be stepped or ramped up or down, may cycle, and/or may be random. Further, instead of vibrations, an impulse loading may be employed. The frequency and the amplitude of the impulse may be varied just as they may be for the vibrations. In all instances the frequency and amplitude may be changed in unison with each other or independent of each other.

The amount and frequency of the force imparted to the bond at the leading edge of the crack may be controlled to maximize a speed of the process. Fatigue failure is influenced both by a magnitude of applied force and a frequency of application. Increasing either the magnitude or frequency of applied force decreases the amount of time it takes for the fatigue failure to occur. However, the method requires that the magnitude of the force applied to the resin bond material 32 not exceed a mechanical yield strength of the external tape 28. Consequently, in order to reduce the amount of time it takes to break the bond it may be desired in some embodiments to monitor the system to ensure a maximum acceptable force is applied at the maximum possible frequency to the leading edge 42 of the crack.

The amount of force felt by the leading edge 42 of the bond 30 for every cycle of vibration depends on an amplitude of vibration of the unbonded portion 50. In order to maximize an amplitude of vibration for a given vibratory input delivered by the vibration device 40, in an exemplary embodiment a natural frequency may be considered. The vibrating assembly includes those parts subject to vibratory induced movement. This may include the unbonded portion 50 and the vibration device 40 if the vibration device 40 is attached to the unbonded portion 50, since each influences the natural frequency at which the unbonded portion 50 will vibrate. A natural frequency of the vibrating assembly is related to both a mass and a length of the vibrating assembly. However, it can be seen that the unbonded portion 50 will change its unbonded portion length $L_{UP}$ as the leading edge 42 of the crack moves along in direction 44, which necessarily changes the mass and length of the vibrating system. This change in mass and length $L_{UP}$ of the unbonded portion 50 will change the natural frequency of the vibrating system as the crack progresses. An increase in the mass and unbonded portion length $L_{UP}$ will likely lower the natural frequency. Consequently, in an exemplary embodiment, the frequency of vibration imparted by the vibration device 40 may vary as a natural frequency of the vibrating assembly changes. This change in natural frequency may be sensed by sensors 56, such as accelerometers, that may be used to monitor for motion.

There may be a fundamental frequency and other resonant frequencies that are multiples of the fundamental frequency for the vibrating assembly. In an embodiment where more than one resonant frequency is present in the vibrating system, the highest resonant frequency the vibration device 40 can deliver may be selected. By doing this, the time it takes to reach fatigue failure is reduced because for any given time period more cycles are delivered at a higher frequency than at a lower frequency.

It may be desired to remove a portion of the end winding 14 before operating the vibration device 40. Trimming a portion of the unbonded portion 50 yields a trimmed unbonded portion 50 with a reduced mass, which increases the natural frequency of the trimmed vibrating system. Vibrating at or near this increased natural frequency in turn reduces the amount of time it takes to reach the fatigue failure at the leading edge 42. In an exemplary embodiment, once the leading edge 42 of the crack has propagated far enough along the original length $L_{BO}$ of the bond 30, the vibration device 40 may be unsecured from its original location and moved in the direction 44 closer to the leading edge 42 of the crack, where it is secured into a subsequent location. In addition to this repositioning of the vibration device 40, as described above, some (or some more) of the unbonded portion 50 may be trimmed and the trimmed vibrating assembly may continue to be vibrated. Trimming some (or some more) of the unbonded portion 50 increases the natural frequency of the trimmed vibrating assembly, which in turn decreases the amount of time before fatigue failure occurs at the leading edge 42 of the crack. This repositioning and trimming may be repeated as many times as is desired to propagate the crack the full original length $L_{BO}$ of the bond 30. Trimming as much of the unbonded portion as is possible will produce the highest natural frequencies, and hence the quickest time to fatigue failure.

Vibrating an unbonded portion 50 of a coil 10 may produce complex waveforms. This is represented schematically by waveform 60 shown in FIG. 3 below the coil 10. The waveform 60 is flat in the bonded portion 46 because the bond 30 restricts motion in that region. However, in the unbonded portion 50 the waveform represents motion. In this figure the waveform 60 includes a wavelength $L_W$ that is shorter than the length $L_{UP}$ of the unbonded portion 50. In such situations nodes 62 may be present where the amplitude of vibration is negligible. Where an amplitude of vibration is negligible, so is a force imparted to the resin bond material 32. Should a node coincide with the leading edge 42 of a crack, negligible force would be imparted to the resin bond material 32. Crack propagation would likely stall in this scenario, or at least slow down significantly. Consequently, dynamic modeling may be used to model the motion of the unbonded portion 50 to ensure that the leading edge 42 of the crack does not coincide with a node. Such dynamic modeling may employ sensors such as sensors 56 to monitor actual motion of the unbonded portion 50. The sensors 56 may provide input to a control system used to control activation of the vibration device 40 such that the frequency/amplitude of the induced vibrations are actively controlled in response to changes in the dynamic properties of the system as the leading edge 42 of the crack progresses.

In this exemplary embodiment only a single coil 10 is shown, and the vibration device 40 is shown as secured only to the single coil 10. However, often there may be two coils in a given core slot 18. The vibration device 40 could be secured to two different coils simultaneously, or a separate vibration device 40 could be attached to each coil. In such an exemplary embodiment, vibrations could be applied without regard for natural frequency. Alternately, the unbonded portions could be monitored and the frequency of vibration adjusted as the natural frequency of the system changes.

The novel method of removing a stator coil from a stator core disclosed herein greatly improves stator rewind procedures. It simplifies removal of the coil by eliminating the need for mechanical systems large enough to forcefully extract the coil from the core. It reduces damage to the coil because the resin bond external to the core is broken, not the external tape that is part of the coil. It reduces the amount of resin left in the slot, and this reduces the effort and time required, for the subsequent final removal of any remaining resin from the core slot. Together these improvements yield a decrease in downtime and cost associated with a stator rewind.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of removing a stator coil from a stator core of an electrical generator, comprising:
   vibrating an unbonded portion of the coil until a resin bond material that forms a bond between the coil and a surface of the core begins to fail due to high cycle fatigue;
   continuing to vibrate the unbonded portion until all the resin bond material fails, thereby breaking the bond; and
   removing the coil from the core once the bond is broken.

2. The method of claim 1, comprising trimming some of the coil prior to vibrating the unbonded portion, wherein the trimmed portion was also not bonded to the core.

3. The method of claim 1, wherein the resin bond material bonds the coil to a slot in the core.

4. The method of claim 1, further comprising vibrating the unbonded portion at a resonant frequency of the unbonded portion.

5. The method of claim 4, further comprising selecting the resonant frequency for vibrating the unbonded portion from a plurality of resonant frequencies of the unbonded portion, wherein a vibration device that causes the vibrations comprises a range of frequencies at which it can vibrate, and wherein the selected resonant frequency is a highest of the plurality of resonant frequencies that is also within the range of frequencies at which the vibration device can vibrate.

6. The method of claim 1, further comprising:
   monitoring motion of the unbonded portion of the coil during the vibration; and
   controlling the vibration in response to the monitored motion.

7. The method of claim 6, further comprising adjusting a frequency of vibration as a resonant frequency of the unbonded portion changes in response to a propagation of a crack through the resin bond material.

8. The method of claim 1, further comprising ensuring vibration induced forces do not induce a force sufficient to tear a binder tape of the coil.

9. The method of claim 1, further comprising monitoring a location of a leading edge of a crack propagating within the resin bond material.

10. The method of claim 9, further comprising initially positioning a vibration device to cause the vibrations, and periodically repositioning the vibration device closer to the leading edge as the crack propagates.

11. The method of claim 10, further comprising trimming some of the unbonded portion after repositioning the vibration device and then continuing vibrating a remaining unbonded portion.

12. The method of claim 9, further comprising ensuring any vibration node present in the unbonded portion does not occur proximate the leading edge of the crack.

13. The method of claim 1, further comprising adjusting a frequency of vibration to span a range of frequencies.

14. The method of claim 13, wherein the frequency of vibration is adjusted in a cyclic manner within the range of frequencies.

15. The method of claim 1, further comprising adjusting an amplitude of vibration.

* * * * *